US012530122B2

(12) United States Patent
Liu

(10) Patent No.: US 12,530,122 B2
(45) Date of Patent: Jan. 20, 2026

(54) METHODS AND SYSTEMS FOR DATA PROCESSING

(71) Applicant: YANGTZE MEMORY TECHNOLOGIES CO., LTD., Wuhan (CN)

(72) Inventor: Dongpo Liu, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/594,687

(22) Filed: Mar. 4, 2024

(65) Prior Publication Data

US 2025/0103208 A1    Mar. 27, 2025

(30) Foreign Application Priority Data

Sep. 26, 2023   (CN) .......................... 202311259982.1

(51) Int. Cl.
*G06F 3/00*    (2006.01)
*G06F 3/06*    (2006.01)

(52) U.S. Cl.
CPC .......... *G06F 3/0611* (2013.01); *G06F 3/0644* (2013.01); *G06F 3/067* (2013.01)

(58) Field of Classification Search
CPC ....... G06F 3/0611; G06F 3/0644; G06F 3/067
See application file for complete search history.

(56) References Cited

U.S. PATENT DOCUMENTS

| 10,037,279 B1* | 7/2018 | Bigman ............... G06F 12/0891 |
| 2013/0227218 A1 | 8/2013 | Chang et al. |
| 2016/0088080 A1 | 3/2016 | Bare, II et al. |
| 2017/0147237 A1* | 5/2017 | Fang .................... G06F 11/008 |
| 2019/0026290 A1 | 1/2019 | Huang et al. |

FOREIGN PATENT DOCUMENTS

| CN | 114675777 A | 6/2022 |
| CN | 115079958 A | 9/2022 |
| CN | 115933988 A | 4/2023 |

OTHER PUBLICATIONS

Yangtze Memory Technologies Co., Ltd., "First Examination Opinion Notice," Date of Pub.: Sep. 22, 2025, CN Patent App. No. 202311259982.1, 7 p. (plus 7 page translation).

* cited by examiner

*Primary Examiner* — Craig S Goldschmidt
(74) *Attorney, Agent, or Firm* — Conley Rose, P.C.

(57) ABSTRACT

Examples of the present application relate to a method and system for data processing, and relate to the field of storage technology. The method includes: receiving an access request for a data block, the data corresponding to the data block being stored in the first storage pool; in response to the access request, determining a second storage pool in accordance with the data heat level of the data block and the bandwidth required for the data block; writing the data corresponding to the data block into the second storage pool. Thus, the overall access efficiency of the storage pool in the cloud computing platform may be improved.

20 Claims, 7 Drawing Sheets

METHODS AND SYSTEMS FOR DATA PROCESSING

CROSS-REFERENCE TO RELATED APPLICATIONS

The present application claims priority to Chinese Patent Application No. 2023112599821, which was filed Sep. 26, 2023, is titled "A DATA PROCESSING METHOD AND SYSTEM," and is hereby incorporated herein by reference in its entirety.

TECHNICAL FIELD

Examples of the present application relate to the field of storage technology, and in particular, to a method and system for data processing.

BACKGROUND

With the development of technology, cloud computing platforms may eliminate storage pools with poor performance or old storage pools and add storage pools with higher performance or new storage pools, thereby continuously rising, replacing and constructing cloud storage software and hardware arrays, and continuously performing data backup and migration.

SUMMARY

A first aspect of an example of the present application provides a method for data processing. The method includes: receiving an access request for a data block, the data corresponding to the data block being stored in a first storage pool; in response to the access request, determining a second storage pool in accordance with the data heat level of the data block and the bandwidth required for the data block; and writing the data corresponding to the data block into the second storage pool.

In the technical solution described above, an access request for a data block is received, a second storage pool is determined in accordance with the data heat level of the data block and the bandwidth required for the data block, and the data corresponding to the data block is written from the first storage pool to the second storage pool. Data migration is performed in units of data blocks, and in accordance with the data heat level of the data block and the required bandwidth, the data corresponding to the data block is migrated to the storage pool with corresponding performance.

In a possible implementation of the first aspect, determining a second storage pool in accordance with the data heat level of the data block and the bandwidth required for the data block includes: when the heat level difference between the data heat level of the data block and the reference heat level is within the threshold range of heat level difference between the heat level of the data block that the second storage pool supports to store and the reference heat level, and the bandwidth difference between the bandwidth required for the data block and the remaining bandwidth of the first storage pool is within the threshold range of bandwidth difference between the second storage pool and the first storage pool, the second storage pool is determined. In a possible implementation described above, the changes of the heat level of the data block for the access request may be obtained in accordance with the heat level difference between the data heat level of the data block and the reference heat level. If the heat level difference is within the threshold range of heat level difference between the heat level of the data block that the second storage pool supports to store and the reference heat level, then the data block for the access request meets the temperature requirement for migrating to the second storage pool. In accordance with the bandwidth difference between the bandwidth required for the data block and the remaining bandwidth of the first storage pool, the condition for the bandwidth of the data block for the access request may be obtained, and if the bandwidth difference is within the threshold range of bandwidth difference between the second storage pool and the first storage pool, then the data block for the access request meets the bandwidth requirement for migrating to the second storage pool. When the data block for the access request meets both the heat level requirement for migrating to the second storage pool and the bandwidth requirement for migrating to the second storage pool, the data corresponding to the data block is migrated to the second storage pool.

In a possible implementation of the first aspect, the performance of the second storage pool is different from the performance of the first storage pool. The performance includes at least one of access speed or access delay. In the possible implementation described above, data corresponding to data blocks at different heat levels and bandwidth changes are migrated to a storage pool with corresponding performance, the performance of the storage pool including at least one of access speed or access delay.

In a possible implementation of the first aspect, the data heat level of the data block is determined in accordance with the number of accesses of the data block and the access request delay of the data block, with the access request delay of the data block being the time difference between the time when accessing the storage area in the first storage pool in which the data corresponding to the data block is stored and the time when receiving the response from the first storage pool. In a possible implementation described above, the data heat level is determined in accordance with the number of accesses of the data block and the access request delay of the data block, the access request delay of the data block being the time difference between the time when accessing the storage area in the first storage pool in which the data corresponding to the data block is stored and the time when receiving the response from the first storage pool.

In a possible implementation of the first aspect, the reference heat level is the heat level of the data block that the first storage pool supports to store. In a possible implementation described above, the reference heat level is determined in accordance with the heat level of the data block that the first storage pool supports to store, and in turn, the change to the heat level of the data block for the access request may be obtained to provide a basis for accurate data migration.

In a possible implementation of the first aspect, the reference heat level is the heat level of historical access for the data block. In a possible implementation described above, the reference heat level is determined in accordance with the heat level of historical access for the data block, and in turn, the change to the heat level of the data block may be obtained to provide a basis for accurate data migration.

In a possible implementation of the first aspect, the method further includes: receiving a first indication information, wherein the first indication information is to indicate the remaining bandwidth of the first storage pool and the reference heat level. In a possible implementation described above, first indication information which indicates the remaining bandwidth and reference heat level of the first storage pool may be received, to provide a basis for analyzing the heat level difference and bandwidth difference.

In a possible implementation of the first aspect, writing the data corresponding to the data block into the second storage pool includes: writing the data corresponding to the data block into the second storage pool within a preset time, the preset time determined in accordance with the access network delay of the data block, with the access network delay of the data block being the time difference between the time when sending the access request and the time when receiving the access request. In a possible implementation described above, a preset time is determined in accordance with the access network delay of the data block, and the data corresponding to the data block is written into the second storage pool within the preset time. It may be determined whether the data corresponding to the data block is migrated in real time or at the time when the device is relatively idle in accordance with the access network delay of the data block.

In a possible implementation of the first aspect, the method further includes: receiving second indication information which is to indicate the access network delay of the data block. In a possible implementation described above, the access network delay of the data block is stored in other devices, and when the access network delay is required, the receipt of the second indication information indicating the access network delay of the data block may save storage space and provide a basis for determining the preset time.

In a possible implementation of the first aspect, the data block is one of a plurality of data blocks in a target file, and data corresponding to at least two data blocks of the plurality of data blocks respectively is stored in different storage pools. In a possible implementation described above, since data migration is performed in units of data blocks, data corresponding to different data blocks in a same file may be migrated to different storage pools. The data corresponding to data blocks in a same file is not required to be stored in a same storage pool.

A second aspect of the example of the present application provides a system for data processing, the system including a computing node, and a first storage pool and a second storage pool coupled with the computing node. The computing node is configured to: receive an access request for a data block, the data corresponding to the data block being stored in the first storage pool; in response to the access request, determine a second storage pool in accordance with the data heat level of the data block and the bandwidth required for the data block; and write the data corresponding to the data block into the second storage pool.

In a possible implementation of the second aspect, the computing node is configured to: when the heat level difference between the data heat level of the data block and the reference heat level is within the threshold range of heat level difference between a heat level of a data block that the second storage pool supports to store and the reference heat level, and the bandwidth difference between the bandwidth required for the data block and the remaining bandwidth of the first storage pool is within the threshold range of bandwidth difference between the second storage pool and the first storage pool, determine the second storage pool.

In a possible implementation of the second aspect, the performance of the second storage pool is different from the performance of the first storage pool. The performance includes at least one of access speed or access delay.

In a possible implementation of the second aspect, the data heat level of the data block is determined in accordance with the number of accesses of the data block and the access request delay of the data block. The access request delay of the data block is the time difference between the time when accessing the storage area in the first storage pool in which the data corresponding to the data block is stored and the time when receiving the response from the first storage pool.

In a possible implementation of the second aspect, the reference heat level is the heat level of the data block that the first storage pool supports to store.

In a possible implementation of the second aspect, the reference heat level is the heat level of historical access for the data block.

In a possible implementation of the second aspect, the computing node is further configured to: receive first indication information, wherein the first indication information is to indicate the remaining bandwidth of the first storage pool and the reference heat level.

In a possible implementation of the second aspect, the computing node is configured to: write the data corresponding to the data block into the second storage pool within a preset time, the preset time determined in accordance with the access network delay of the data block. The access network delay of the data block is the time difference between the time when sending the access request and the time when receiving the access request.

In a possible implementation of the second aspect, the computing node is configured to: receive second indication information, where the second indication information is to indicate the access network delay of the data block.

In a possible implementation of the second aspect, the data block is one of a plurality of data blocks in a target file, and data corresponding to at least two data blocks of the plurality of data blocks respectively is stored in different storage pools.

A third aspect of an example of the present application provides a computer-readable storage medium, the computer-readable storage medium storing program code therein. The program code may be invoked by the processor to execute the method provided by the first aspect or any of the possible implementations of the first aspect described above.

Another aspect of the present application provides a computer program product, and when the computer program product runs on a computer, the computer program product causes the computer to execute the method provided by the first aspect or any of the possible implementations of the first aspect.

DETAILED DESCRIPTION

Figure 1:
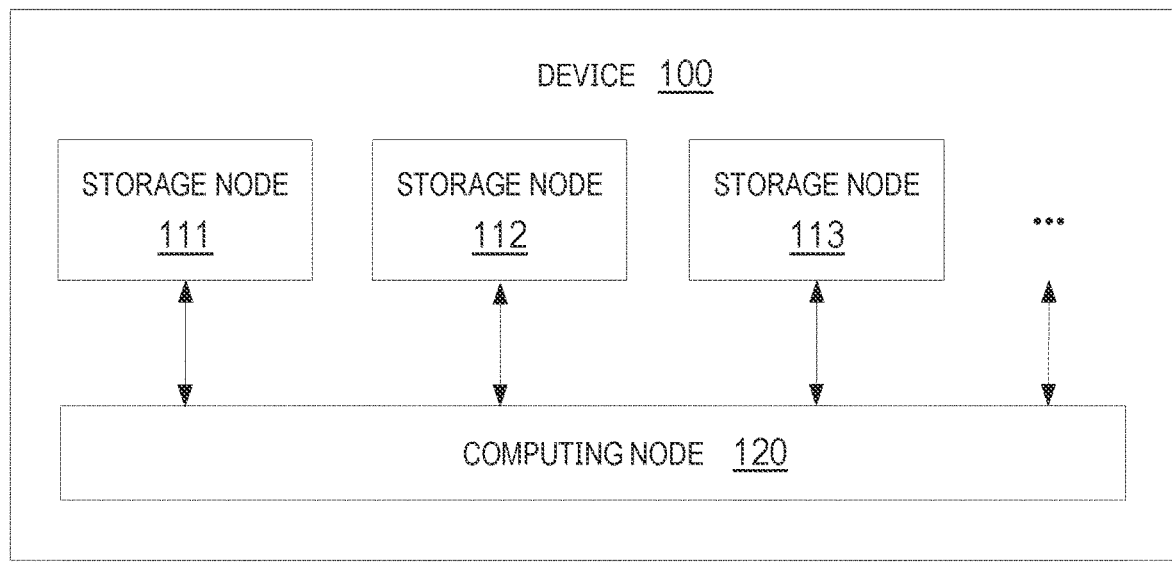
FIG. 1 is an architectural diagram of a cloud platform provided by an example of the present application.

The technical solutions in some examples of the present application may be clearly and completely described below in conjunction with the accompanying drawings. The described examples are only some, and not all, of the examples of the present application. All other examples obtained by those skilled in the art based on the examples provided in the present application belong to the claimed scope of the present application.

In the description of the present application, the terms "first" and "second" are used for descriptive purposes only, and should not be understood as indicating or implying relative importance or implicitly specifying the quantity of indicated technical features. Thus, a feature defined as "first" and "second" may explicitly or implicitly include one or more of these features. In the description of examples of the present application, "plurality of" means two or more, unless specified otherwise.

In describing some examples, the term "coupled" may be used to indicate that two or more elements are in direct physical or electrical contact. However, the term "coupled" may also mean that two or more elements are not in direct contact with each other, but still co-operate or interact with each other. Examples disclosed herein are not necessarily limited by the context herein.

"At least one of A, B and C" has the same meaning as "at least one of A, B or C" and both include the following combinations of A, B and C: only A; only B; only C; a combination of A and B; a combination of A and C; a combination of B and C; and a combination of A, B and C. "A and/or B" includes the following three combinations: only A; only B; only C; and a combination of A and B. The use of "suitable for" or "configured to" herein means open and inclusive language that does not exclude devices that are suitable for or configured to perform additional tasks or operations.

Before introducing the examples of the present application, the application scenarios of the examples of the present application are first introduced and explained. The technical solutions provided by the examples of the present application may be applied to a cloud computing platform. A cloud computing platform, also known as cloud platform, refers to a service based on hardware resources and software resources, which provides computing, network and storage capabilities. A computing node and a storage node may include nodes in the cloud platform. A computing node is used to perform data calculation functions, and hardware resources of a computing node may include a computing device, e.g., a server, a desktop computer, or a processor. A storage node is used to perform the function of data storage, and hardware resources of a storage node may include a storage pool. For example, hardware resources of a computing node include a communication interface and processor, and hardware resources of a storage node include a communication interface and storage pool, a plurality of computing nodes and storage nodes may be in a cloud platform, and the computing nodes and storage nodes may communicate through communication interfaces.

In an implementation, the cloud platform employs an integrated storage and computing structure, i.e., the computing node and the storage node are provided in a same device. For example, as shown in FIG. 1, the device 100 includes a plurality of storage nodes (storage nodes 111, 112, 113, . . . ) and a computing node 120. Each storage node in the plurality of storage nodes is coupled to a computing node 120, and the computing node 120 may store data to any one of the plurality of storage nodes.

Figure 2:
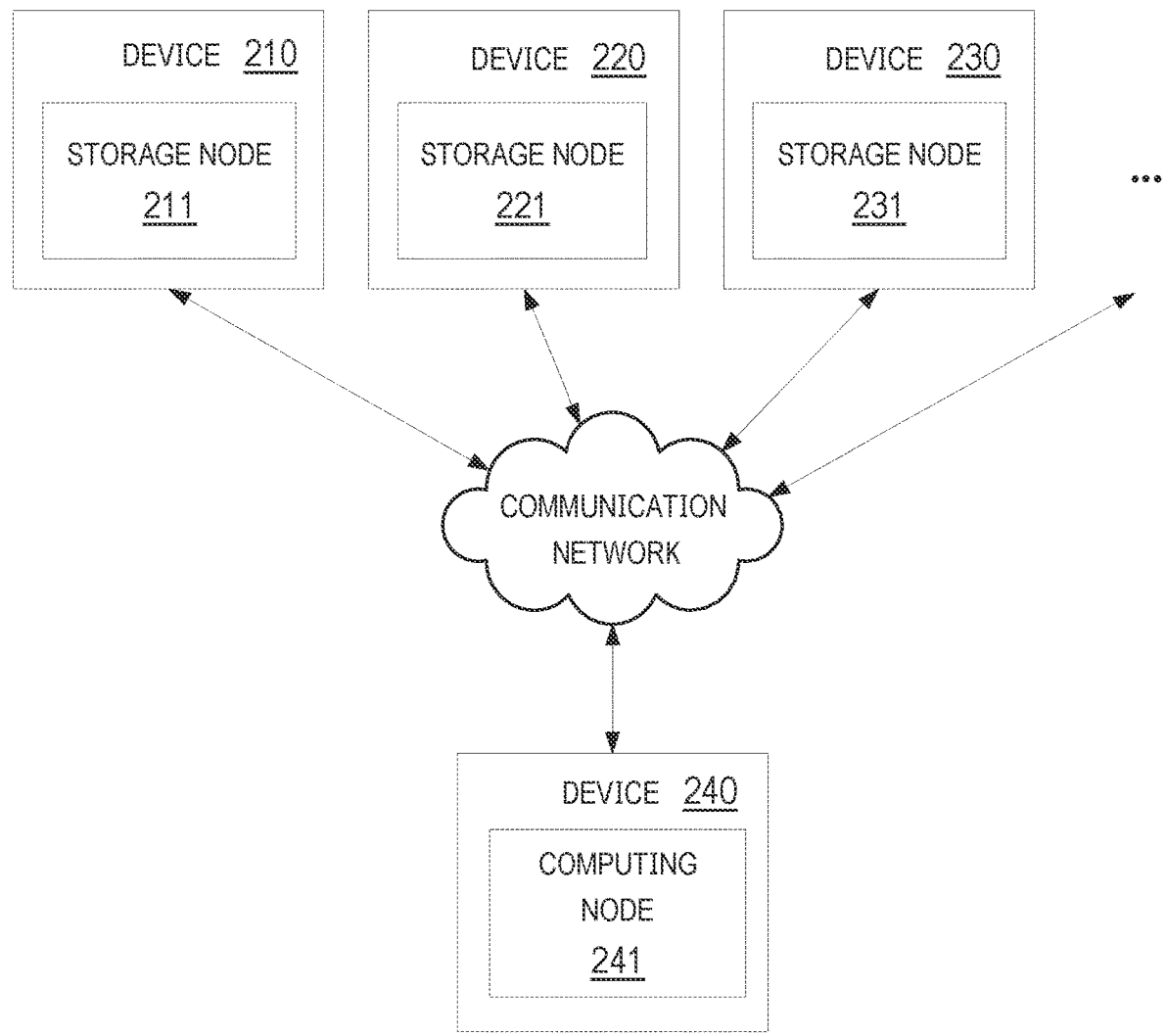
FIG. 2 is an architectural diagram of a cloud platform provided by an example of the present application.

In another implementation, the cloud platform employs a separated storage and computing structure, i.e., the computing node and the storage node are provided in different devices. For example, as shown in FIG. 2, the device 210 includes a storage node 211, the device 220 includes a storage node 221, the device 230 includes a storage node 231, and the cloud platform may also include more devices and storage nodes therein. The device 240 includes a computing node 241, and the device 240 may communicate with the devices 210, 220, 230, . . . through a communication network, so that the computing node 241 may store data into any one of the storage nodes 211, 221, 231, . . . .

With the development of technology, a cloud platform may eliminate storage pools with poor performance or old storage pools in a storage node and add storage pools with higher performance or new storage pools, thereby continuously rising, replacing and constructing cloud storage software and hardware arrays, and continuously performing data backup and migration. Data migration may be performed in units of files. A file often includes a plurality of data blocks, the data corresponding to each data block in the plurality of data blocks may be accessed independently, in accordance with the access status of the data corresponding to each data block, the heat level of each data block may be determined, and data blocks at a higher heat level are usually a small number of data blocks in a file. If some data blocks in a file have a high heat level, the heat level of the file may increase accordingly. In one example, the heat level of a file is the number of accesses per time unit of the file, and the number of accesses of the file is the sum of the access times of data corresponding to all data blocks in the file. According to the migration strategy, a file with increasing heat level is migrated to a storage pool with higher performance.

Figure 3:
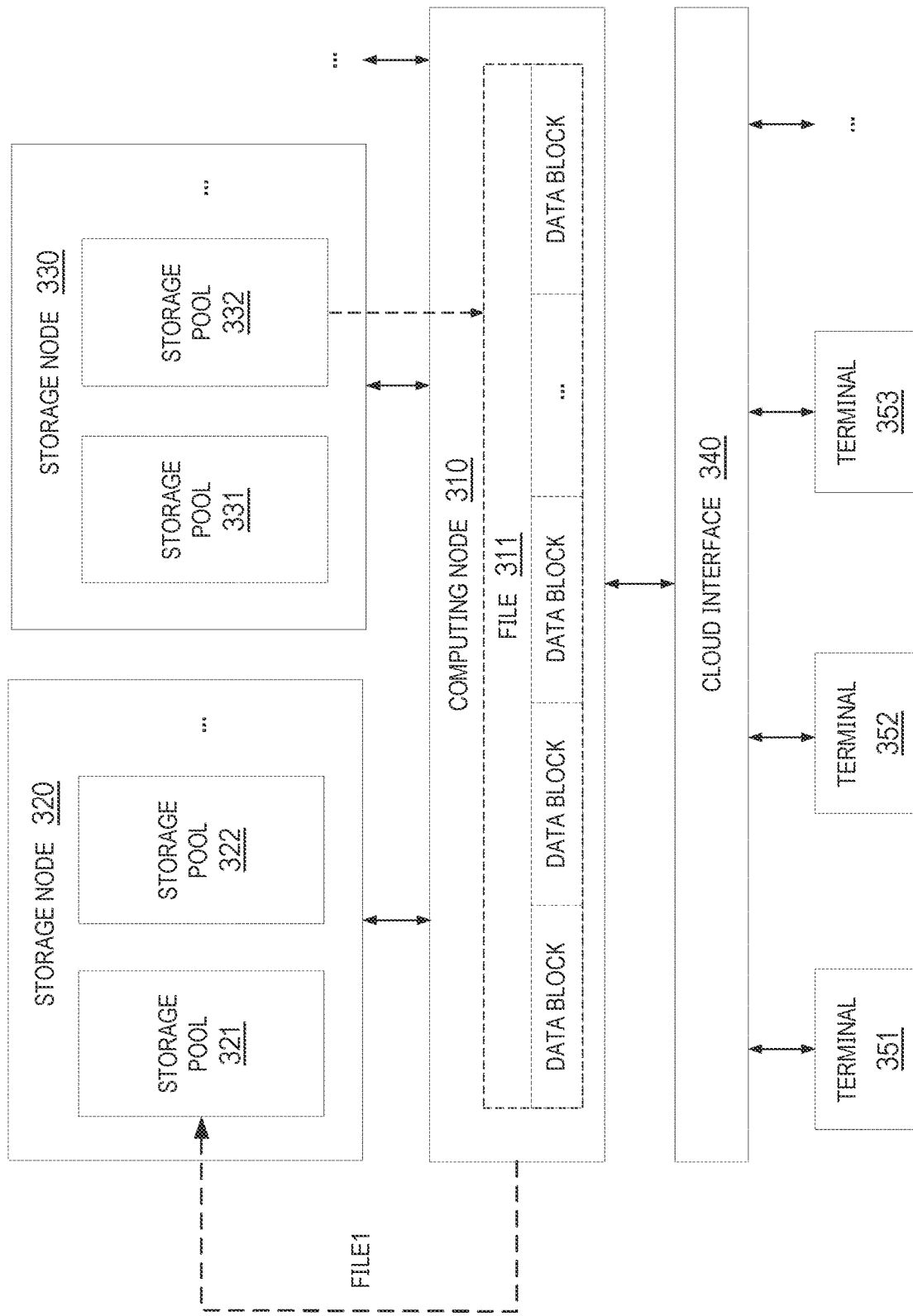
FIG. 3 is a structural schematic diagram of a cloud platform provided by an example of the present application.

In one example, as shown in FIG. 3, the cloud platform includes a computing node 310, a storage node 320, a storage node 330 and other storage nodes, the storage node 320 includes a storage pool 321, a storage pool 322 and other storage pools, and the storage node 330 includes a storage pool 331, a storage pool 332 and other storage pools. The computing node 310 in the cloud platform may communicate with the terminal 351, the terminal 352, the terminal 353 and other terminals through the cloud interface 340. The file 311 is stored in the storage pool 332 of the storage node 330. The file 311 includes a plurality of data blocks. Since the file 311 is at a high heat level, the computing node 310 writes the file 311 from the storage pool 332 of the storage node 330 into the storage pool 321 of the storage node 320, wherein in addition to data blocks at a high heat level, the file 311 also includes other data blocks, e.g., data blocks at a low heat level, and the efficiency for data migration and flexibility of the cloud platform are low.

Figure 4:
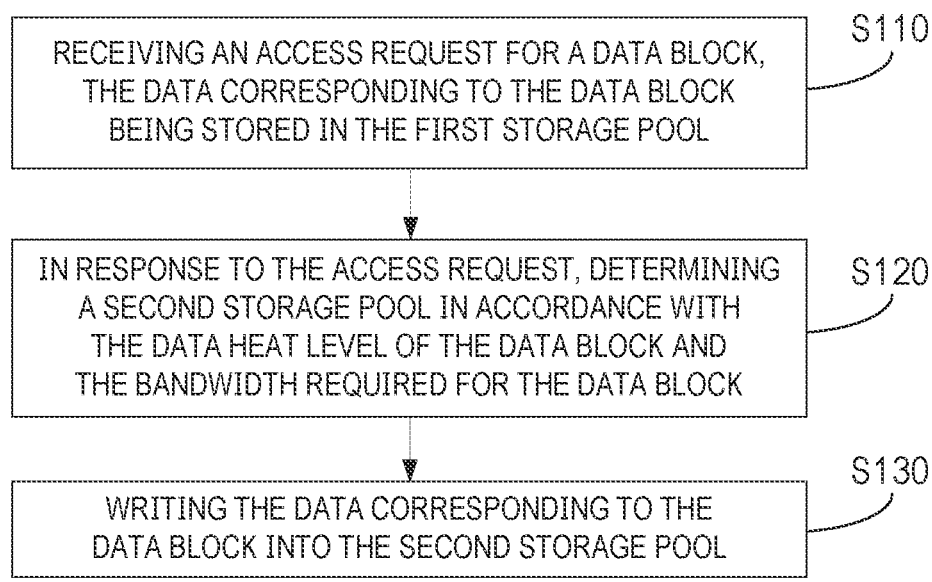
FIG. 4 is a schematic diagram of a method for data processing provided by an example of the present application.

Referring to FIG. 4, an example of the present application provides a method for data processing, including:

S110: receiving an access request for a data block, the data corresponding to the data block being stored in the first storage pool.

S120: in response to the access request, determining a second storage pool in accordance with the data heat level of the data block and the bandwidth required for the data block.

S130: writing the data corresponding to the data block into the second storage pool.

The access request may include a read request. The data heat level may include the current heat level of the data block for the access request. The bandwidth required for the data block is related to the data heat level, and the higher the heat level of the data block and the more data in the storage pool corresponding to the data block that requires to be transmitted, the greater the bandwidth required for the data block.

In one example, this method is applied to a cloud platform. The storage system of the cloud platform includes an internet application, a public cloud storage interface, a cloud storage file system, a data block temperature server, a client for data block temperature, etc. The internet application may run on a terminal, and the cloud storage file system and data block temperature server may run on a computing node, and a data block temperature client may run on a storage node. The internet application may communicate with the cloud storage file system through a public cloud storage interface.

In one example, a terminal sends an access request for the data block to a computing node. Prior to this, the computing node may allocate a storage pool for the data corresponding to the data block, and store the data corresponding to the data block to the corresponding storage pool, e.g., a first storage pool.

The computing node receives the access request for the data block and sends a read command to the first storage pool in accordance with the access request. The first storage pool receives the read command, reads the corresponding data, and sends the data corresponding to the data block to the computing node.

The computing node receives the data corresponding to the data block and determines a second storage pool in accordance with the data heat level of the data block and the bandwidth required for the data block.

The computing node sends a write command related to data corresponding to the data block to the second storage pool. The second storage pool receives the data corresponding to the data block and completes the writing of the data corresponding to the data block.

In some examples, after the computing node sends the data corresponding to the data block to the second storage pool, the first storage pool may delete the data corresponding to the data block or mark it as invalid.

For example, the first storage pool and the second storage pool may be located in a same storage node, or different storage nodes, that is, the data corresponding to the data block for the access request may be migrated in a same storage node or among different storage nodes. Multiple data in a storage pool may be migrated in a same storage node or among different storage nodes in units of data blocks.

For example, a data block that requires to be migrated may include a data block at an increasingly hotter level (increasing heat level) or increasingly cooler level (decreasing heat level). For example, in response to the access request, in accordance with the data heat level of the data block and the bandwidth required for the data block, the data block is determined to be a data block at an increasingly hotter level, and then the data corresponding to the data block is migrated to the second storage pool. The performance of the second storage pool is higher than that of the first storage pool. For another example, in response to the access request, in accordance with the data heat level of the data block and the bandwidth required for the data block, the data block is determined to be a data block at an increasingly cooler level, and then the data corresponding to the data block is migrated to the second storage pool. The performance of the second storage pool is lower than that of the first storage pool.

For example, a data block at a constant heat level (heat level does not change significantly) may not be migrated. For example, in response to the access request, in accordance with the data heat level of the data block and the bandwidth required for the data block, the data block is determined to be a data block at a constant heat level. The data corresponding to the data block is not migrated, and the data corresponding to the data block is stored in the first storage pool.

When massive data is stored in a storage pool, as time elapses, the stability of value for most data blocks decreases, and a migration strategy is required to be made in accordance with certain rules, e.g., a heat level of data block. In an example of the present application, by identifying a data block at an increasingly hotter level, a data block at an increasingly cooler level and a data block at a constant heat level in the storage pool, a migration strategy is determined in accordance with heat level of the data block, and the data corresponding to the data blocks is migrated to the corresponding storage pool. For example, in accordance with the quality of service (QoS) strategy, the data corresponding to a data block at an increasingly hotter level is migrated to a storage pool with a higher performance, higher bandwidth, and higher cost, and the data corresponding to a data block at an increasingly cooler level is migrated to a storage pool with a lower performance, lower bandwidth, and lower cost, and the data corresponding to a data block at a constant heat level is not migrated. Thus, to satisfy the current development requirements of cloud computing, new storage pools and computing nodes with higher performance may be added every day, however, changes to the heat level of a data block may occur every second. A computing node continuously migrates the data corresponding to the data block to the corresponding storage pool in accordance with the data heat level, and completes the migration of the data corresponding to the data block in the process of separating the data blocks at a hot and cold level. Thus, data may be migrated accurately. In addition, the cloud storage file system running on the computing node is compatible with storage pools with various performance (e.g., hard disks), and so the utilization rate of the stock storage pool is improved.

In a method provided by an example of the present application, an access request for a data block is received, a second storage pool is determined in accordance with the data heat level of the data block and the bandwidth required for the data block, and the data corresponding to the data block is migrated from the first storage pool to the second storage pool. Data migration is performed in units of data blocks, and in accordance with the data heat level of the data block and the required bandwidth, the data corresponding to the data block is migrated to the storage pool with corresponding performance, to avoid data which differs significantly in terms of the data heat level in multiple data of the same file from being migrated to the same storage pool, and allows accurate data migration. Thus, a data migration strategy for the cloud storage is redefined and the management capability for the cloud storage space is improved, e.g., the overall efficiency of accessing a large amount of data in the storage pool as well as the bandwidth utilization efficiency of the storage pool are improved, and storage cost is reduced.

In a possible implementation, S120 (determining the second storage pool in accordance with the data heat level of the data block and the bandwidth required for the data block) may include: when the heat level difference between the data heat level of the data block and the reference heat level is within the threshold range of heat level difference between a heat level of a data block that the second storage pool supports to store and the reference heat level, and the bandwidth difference between the bandwidth required for the data block and the remaining bandwidth of the first storage pool is within the threshold range of bandwidth difference between the second storage pool and the first storage pool, determining the second storage pool.

The heat level difference between the data heat level of the data block and the reference heat level may refer to the value obtained by subtracting the reference heat level from the data heat level of the data block.

In an example, the reference heat level may be to indicate the heat level of the data block for the access request. For example, the reference heat level may include the heat level of historical access for the data block. Every time the data corresponding to the data block is accessed, the heat level of the data block may change, and the heat level of historical access for the data block includes the heat levels resulting from each of the changes. The reference heat level may include any of heat levels of historical access for the data block, e.g., the reference heat level includes the changed heat level resulting from the data corresponding to the data block being accessed last time. Thus, the reference heat level is determined in accordance with the heat level of historical access for the data block, and the change to the heat level of the data block may be obtained to provide a basis for accurate data migration.

In another example, the reference heat level may also be to indicate the heat level of data blocks other than the data block for the access request. For example, the heat levels of all data blocks stored in a plurality of storage pools in a storage node are divided into a preset number of levels, the performance of the plurality of storage pools in a storage node is divided into a preset number of levels, and the performance of each storage pool is mapped to the heat level of each level of data blocks. The preset number may be equal to the number of storage pools, or may not be equal to the number of storage pools, and examples of the present application are not limited to this. The reference heat level includes the heat level of data blocks that the first storage pool supports to store, i.e., the heat level of data blocks at a level corresponding to the performance of the first storage pool. Since the heat levels of the data blocks in the storage node may change, the operations of dividing the heat level of all data blocks in the storage node into different levels, and mapping the performance of each storage pool to the heat level of each level of data blocks may be performed once every other first period. In this example, the heat level of the data block supported by the first storage pool may include the first heat level range. If the data heat level of the data block is greater than the maximum value of the first heat level in the first heat level range, the heat level difference may include a value obtained by subtracting the maximum value of the first heat level in the first heat level range from the data heat level of the data block. If the data heat level of the data block is less than the minimum value of the first heat level in the first heat level range, the heat level difference may include the value obtained by subtracting the minimum value of the first heat level in the first heat level range from the data heat level of the data block. Thus, the reference heat level is determined in accordance with the heat level of the data block that the first storage pool supports to store, and the change to the heat level of the data block for the access request may be obtained to provide a basis for accurate data migration.

Furthermore, the heat level of the data block that the second storage pool supports to store may include a second heat level range, and the threshold range of heat level difference between the heat levels of the data blocks that the second storage pool supports to store and the reference heat level may refer to the range obtained by subtracting the reference heat level from the second heat level range.

In an example, the reference heat level includes the heat level of historical access for the data block. In accordance with the performance of the first storage pool, the first storage pool is set to support the storage of data blocks which are at heat levels in the first heat level range; in accordance with the performance of the second storage pool, the second storage pool is set to support the storage of data blocks which are at heat levels in the second heat level range. If the heat level of historical access for the data block is less than the minimum value of the second heat level in the second heat level range, the minimum value of the heat level difference in the threshold range of heat level difference may include the value obtained by subtracting the heat level of historical access for the data block from the minimum value of the second heat level in the second heat level range. The maximum value of the heat level difference in the threshold range of heat level difference may include the value obtained by subtracting the heat level of historical access for the data block from the maximum value of the second heat level in the second heat level range. If the heat level of historical access for the data block is greater than the maximum value of the second heat level in the second heat level range, the minimum value of the heat level difference in the threshold range of heat level difference may include the value obtained by subtracting the heat level of historical access for the data block from the minimum value of the second heat level in the second heat level range. The maximum value of the heat level difference in the threshold range of heat level difference may include the value obtained by subtracting the heat level of historical access for the data block from the maximum value of the second heat level in the second heat level range.

In another example, the reference heat level includes the heat level of the data block that the first storage pool supports to store. In accordance with the performance of the first storage pool, the first storage pool is set to support storage of data blocks which are at heat levels in the first heat level range; in accordance with the performance of the second storage pool, the second storage pool is set to support storage of data blocks which are at heat levels in the second heat level range. If the maximum value of the first heat level in the first heat level range is less than the minimum value of the second heat level in the second heat level range, the minimum value of heat level difference in the threshold range of heat level difference may include the value obtained by subtracting the maximum value of the first heat level in the first heat level range from the minimum value of the second heat level in the second heat level range. The maximum value of the heat level difference in the threshold range of heat level difference may include the value obtained by subtracting the maximum value of the first heat level in the first heat level range from the maximum value of the second heat level in the second heat level range. If the minimum value of the first heat level in the first heat level range is greater than the maximum value of the second heat level in the second heat level range, the minimum value of heat level difference in the threshold range of heat level difference may include the value obtained by subtracting the maximum value of the first heat level in the first heat level range from the minimum value of the second heat level in the second heat level range. The maximum value of heat level difference in the threshold range of heat level difference may include the value obtained by subtracting the minimum value of the first heat level in the first heat level range from the maximum value of the second heat level in the second heat level range.

Figure 5:
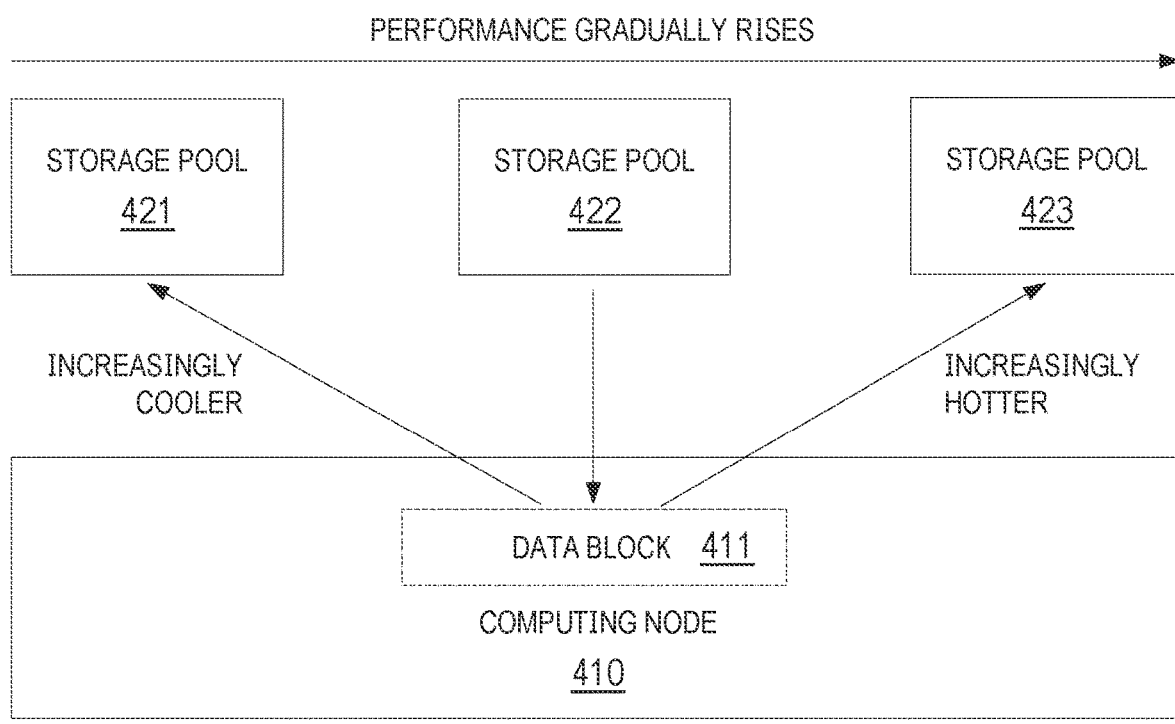
FIG. 5 is a schematic diagram of a method for data processing provided by an example of the present application.

Next, with reference to FIG. 5, take the reference heat level including the heat level of historical access for the data block as an example to illustrate the situation where the heat level difference is within the threshold range of heat level difference. The following values of heat levels are examples, and in practice, the values of heat levels may include other values, and examples of the present application are not limited to this. The computing node 410 may communicate with the storage pool 421, the storage pool 422, and the storage pool 423. The performance of the storage pool 421, the storage pool 422, and the storage pool 423 gradually rises. The first storage pool includes the storage pool 422, the data corresponding to the data block 411 is stored in the storage pool 422, and the computing node 410 reads the data corresponding to the data block 411 from the storage pool 422.

In a first situation, the data block 411 is a data block at an increasingly hotter level. The data heat level of this data block is 70 degrees, the heat level of the historical access for this data block is 50 degrees, the first heat level range is from 31 degrees to 60 degrees, and the second heat level range is from 61 degrees to 90 degrees. The heat level difference may include the value obtained by subtracting the heat level of historical access for the data block from the data heat level of the data block, i.e., +20 degrees. The minimum value of heat level difference in the threshold range of heat level difference may include the value obtained by subtracting the heat level of historical access for the data block from the minimum value of the second heat level in the second heat level range, i.e., +11 degrees. The maximum value of heat level difference in the threshold range of heat level difference may include the value obtained by subtracting the heat level of historical access for the data block from the maximum value of the second heat level in the second heat level range, i.e., +40 degrees. The heat level difference (+20 degrees) between the data heat level of the data block and the reference heat level is located in the threshold range (+11 degrees to +40 degrees) of the heat level difference between the heat levels of the data blocks that the second storage pool supports to store and the reference heat level, and the second storage pool may be determined to be the storage pool 423. The computing node 410 writes the data corresponding to the data block 411 into the storage pool 423.

In a second situation, the data block is a data block at an increasingly cooler level. The data heat level of this data block is 20 degrees, the heat level of the historical access for this data block is 50 degrees, the first heat level range is from 31 degrees to 60 degrees, and the second heat level range is from 1 degree to 30 degrees. The heat level difference may include the value obtained by subtracting the heat level of historical access for the data block from the data heat level of the data block, i.e., −30 degrees. The minimum value of heat level difference in the threshold range of heat level difference may include the value obtained by subtracting the heat level of historical access for the data block from the minimum value of the second heat level in the second heat level range, i.e., −49 degrees. The maximum value of heat level difference in the threshold range of heat level difference may include the value obtained by subtracting the heat level of historical access for the data block from the maximum value of the second heat level in the second heat level range, i.e., −20 degrees. The heat level difference (−30 degrees) between the data heat level of the data block and the reference heat level is located in the threshold range (−49 degrees to −20 degrees) of the heat level difference between the heat levels of the data blocks that the second storage pool supports to store and the reference heat level, and the second storage pool may be determined to be the storage pool 421. The computing node 410 writes the data corresponding to the data block 411 into the storage pool 421.

In a third situation, the data block is a data block at a constant heat level. The data heat level of this data block is 60 degrees, the heat level of the historical access for this data block is 50 degrees, the first heat level range is from 31 degrees to 60 degrees, the data heat level of the data block is within the first heat level range, and the data corresponding to the data block does not require migration.

Next, in conjunction with FIG. 5, take the reference heat level being the heat levels of the data blocks that the first storage pool supports to store (the first heat level range) as an example to illustrate the situation where the heat level difference is within the threshold range of heat level difference. The following values of heat levels are examples, and in practice, the values of heat levels may include other values, and examples of the present application are not limited to this. The computing node 410 may communicate with the storage pool 421, the storage pool 422, and the storage pool 423. The performance of the storage pool 421, the storage pool 422, and the storage pool 423 gradually rises. The first storage pool is the storage pool 422, the data corresponding to the data block 411 is stored in the storage pool 422, and the computing node 410 reads the data corresponding to the data block 411 from the storage pool 422.

In a first example, the data block is a data block at an increasingly hotter level. The data heat level of this data block is 70 degrees, the first heat level range is from 31 degrees to 60 degrees, and the second heat level range is from 61 degrees to 90 degrees. The heat level difference may include the value obtained by subtracting the maximum value of the first heat level in the first heat level range from the data heat level of the data block, i.e., +10 degrees. The minimum value of heat level difference in the threshold range of heat level difference may include the value obtained by subtracting the maximum value of the first heat level in the first heat level range from the minimum value of the second heat level in the second heat level range, i.e., +1 degree. The maximum value of heat level difference in the threshold range of heat level difference may include the value obtained by subtracting the maximum value of the first heat level in the first heat level range from the maximum value of the second heat level in the second heat level range, i.e., +30 degrees. The heat level difference (+10 degrees) between the data heat level of the data block and the reference heat level is located in the threshold range (+1 degree to +30 degrees) of the heat level difference between the heat levels of the data blocks that the second storage pool supports to store and the reference heat level, and the second storage pool may be determined to be the storage pool 423. The computing node 410 writes the data corresponding to the data block 411 into the storage pool 423.

In a second example, the data block is a data block at an increasingly cooler level. The data heat level of this data block is 20 degrees, the first heat level range is from 31 degrees to 60 degrees, and the second heat level range is from 1 degree to 30 degrees. The heat level difference may include the value obtained by subtracting the minimum value of the first heat level in the first heat level range from the data heat level of the data block, i.e., −11 degrees. The minimum value of heat level difference in the threshold range of heat level difference may include the value obtained by subtracting the minimum value of the first heat level in the first heat level range from the minimum value of the second heat level in the second heat level range, i.e., −30 degrees. The maximum value of heat level difference in the threshold range of heat level difference may include the value obtained by subtracting the minimum value of the first heat level in the first heat level range from the maximum value of the second heat level in the second heat level range, i.e., −1 degree. The heat level difference (−11 degrees) between the data heat level of the data block and the reference heat level is located in the threshold range (−1 degree to −30 degrees) of the heat level difference between the heat levels of the data blocks that the second storage pool supports to store and the reference heat level, and the second storage pool may be determined to be the storage pool 421. The computing node 410 writes the data corresponding to the data block 411 into the storage pool 421.

In a third example, the data block is a data block at a constant heat level. The data heat level of this data block is 60 degrees, the first heat level range is from 31 degrees to 60 degrees, the data heat level of the data block is within the first heat level range, and the data corresponding to the data block does not require migration.

In addition, the remaining bandwidth of the first storage pool refers to the bandwidth that the first storage pool may provide. Since hardware device of the storage pool may age in the process of use, the bandwidth provided by the first storage pool may decrease over time. The bandwidth difference between the bandwidth required for the data block and the remaining bandwidth of the first storage pool may include values obtained by subtracting the remaining bandwidth of the first storage pool from the bandwidth required for the data block. The bandwidth difference between the bandwidth required for the data block and the remaining bandwidth of the first storage pool is within the threshold range of bandwidth difference between the second storage pool and the first storage pool, that is, the bandwidth difference is less than the bandwidth difference threshold range.

In a method provided by an example of this application, the changes of the heat level of the data block for the access request may be obtained in accordance with the heat level difference between the data heat level of the data block and the reference heat level. If the heat level difference is within the threshold range of heat level difference between the heat level of the data block that the second storage pool supports to store and the reference heat level, then the data block for the access request meets the temperature requirement for migrating to the second storage pool. In accordance with the bandwidth difference between the bandwidth required for the data block and the remaining bandwidth of the first storage pool, the condition for the bandwidth of the data block for the access request may be obtained, and if the bandwidth difference is within the threshold range of bandwidth difference between the second storage pool and the first storage pool, then the data block for the access request meets the bandwidth requirement for migrating to the second storage pool. When the data block for the access request meets both of the heat level requirement for migrating to the second storage pool and the bandwidth requirement for migrating to the second storage pool, the data corresponding to the data block is migrated to the second storage pool, which allows to accurately migrate the data, improve the overall efficiency for accessing a large amount of data in the storage pool, improve the bandwidth utilization efficiency of the storage pool, and reduce storage cost.

In a possible implementation, the performance of the second storage pool is different from the performance of the first storage pool, where the performance includes at least one of access speed or access delay. In a method provided by an example of the present application, data corresponding to data blocks at different heat levels and with bandwidth changes are migrated to a storage pool with corresponding performance, where the performance of the storage pool includes at least one of access speed or access delay. Thereby, the overall efficiency for accessing a large amount of data in the storage pool, as well as the bandwidth utilization efficiency of the storage pool, may be improved, and storage cost may be reduced.

In a possible implementation, the data heat level of the data block is determined in accordance with the number of accesses of the data block and the access request delay of the data block. The access request delay of the data block is the time difference between the time when accessing the storage area in the first storage pool in which the data corresponding to the data block is stored and the time when receiving the response from the first storage pool.

The calculation formula of the data heat level of the data block may include: data heat level=the number of accesses of the data block*access request delay of the data block. For example, the access request is a read request, and the access request delay of the data block is the time difference between the time when the computing node sends the read request to the storage pool and the time when the computing node receives the data block from the first storage pool. In a method provided by an example of the present application, the data heat level is determined in accordance with the number of accesses of the data block and the access request delay of the data block, and the access request delay of the data block is the time difference between the time when accessing the storage area in the first storage pool in which the data corresponding to the data block is stored and the time when receiving the response from the first storage pool. Developing a strategy for a data-block migration by considering the number of data accesses and the access request delay may increase the overall rate of data access and reduce the time of overall data access.

In a possible implementation, the method further includes: receiving first indication information, wherein the first indication information is to indicate the remaining bandwidth of the first storage pool and the reference heat level. The first indication information may be from the storage pool. For example, the storage pool may send the remaining bandwidth of each storage pool and the reference heat level of all data stored in the storage pool to the computing node every second period. In a method provided by an example of the present application, first indication information indicating the remaining bandwidth and reference heat level of the first storage pool may be received, to provide a basis for analyzing the heat level difference and bandwidth difference.

In a possible implementation, S130 (writing the data corresponding to the data block into the second storage pool) may include: writing the data corresponding to the data block into the second storage pool within a preset time, the preset time being determined in accordance with the access network delay of the data block, and the access network delay of the data block being the time difference between the time when sending the access request and the time when receiving the access request.

The greater the access network delay, the shorter the preset time, and the data is required to be migrated to the second storage pool as soon as the access request is received. The greater the access network delay, the longer the preset time, and migration may be performed when the device is relatively idle, within the preset time after the access request being received. In a method provided by an example of the present application, a preset time is determined in accordance with the access network delay of the data block, and the data corresponding to the data block is written into the second storage pool within the preset time. It may be determined whether the data corresponding to the data block is migrated in real time or at the time when the device is relatively idle in accordance with the access network delay of the data block, such that the management of the cloud storage space is more flexible.

In a possible implementation, the method further includes: receiving second indication information, where the second indication information is to indicate the access network delay of the data block.

The second indication information may be from the storage pool. In one example, the computing node, when receiving the access request, may also receive the communication time from the terminal signal to the computing node, i.e., the access network delay. Each time the computing node accesses the data corresponding to the data block in the storage pool, the network delay of the access may be sent to the storage pool for storage. The storage pool calculates the heat level of the data block in accordance with the access network delay, which may be used as the reference heat level when the data block is accessed later. When the computing node requires to use the access network delay, the storage pool sends the second indication information to the computing node. In a method provided by an example of the present application, the access network delay of the data block is stored in other devices, and when the access network delay is required to be used, the receipt of the second indication information indicating the access network delay of the data block may save storage space and provide a basis for determining the preset time.

In a possible implementation, the data block is one of a plurality of data blocks in a target file, and data corresponding to at least two data blocks of the plurality of data blocks respectively is stored in different storage pools. Data blocks belonging to a same file may be determined in accordance with the file identifier carried by the data block.

Figure 6:
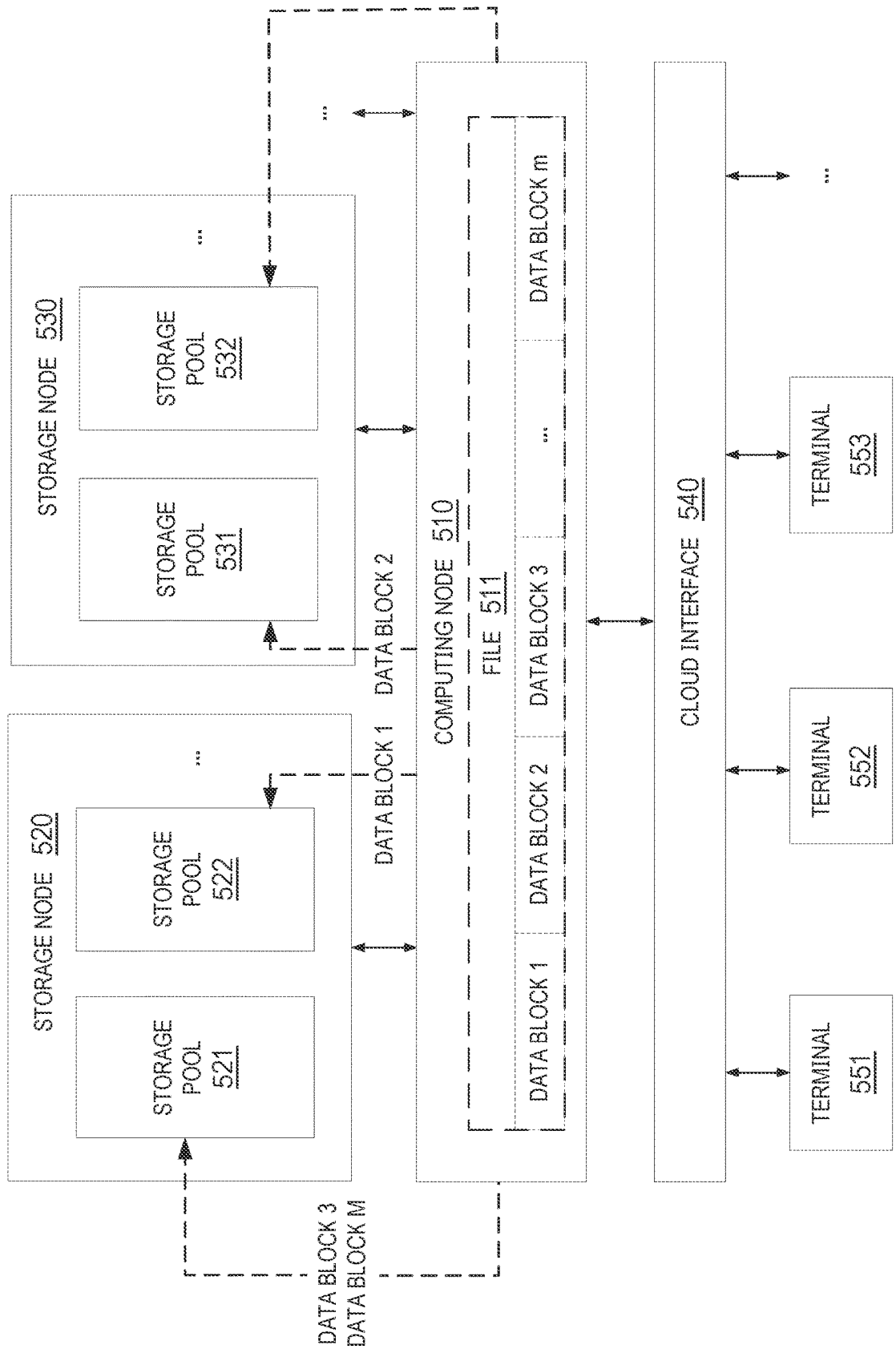
FIG. 6 is a schematic diagram of a method for data processing provided by an example of the present application.

In one example, as shown in FIG. 6, the cloud platform includes a computing node 510, a storage node 520, a storage node 530 and other storage nodes. The storage node 520 includes a storage pool 521, a storage pool 522 and other storage pools, and the storage node 530 includes a storage pool 531, a storage pool 532 and other storage pools. The computing node 510 in the cloud platform may communicate with the terminal 551, the terminal 552, the terminal 553 and other terminals through the cloud interface 540. The computing node 510 may communicate with the storage node 520 and the storage node 530. The file 511 includes data blocks such as data blocks 1, 2, 3, . . . , m, etc. The computing node may migrate, in accordance with the heat level of each data block in the file 511, the data corresponding to data block 1 to the storage pool 522, the data corresponding to data block 2 to the storage pool 531, and the data corresponding to data block 3 and data block m to the storage pool 521, and may migrate the data corresponding to other data blocks to the corresponding storage pool. Thus, data corresponding to at least two data blocks of the plurality of data blocks in the file 511 respectively is stored in different storage pools.

If migration is performed in units of files, data corresponding to data blocks in a same file should be stored in a same storage pool. In a method provided by an example of the present application, since data migration is performed in units of data blocks, data corresponding to different data blocks in a same file may be migrated to different storage pools. The data corresponding to data blocks in a same file is not limited to be stored in a same storage pool. Thus, data may be migrated accurately, and so the overall efficiency of accessing a large amount of data in the storage pool as well as the bandwidth utilization efficiency of the storage pool are improved, and storage cost is reduced.

The above mainly introduces methods provided by examples of the present application, and an example of the present application also provides a system, which includes at least one of a hardware structure or a software module corresponding to each function, in order to implement the functions described above. Those skilled in the art should realize that, in conjunction with the structures and method operations of each example described in the examples disclosed herein, a system provided by an example of the present application can be implemented in the form of hardware or a combination of hardware and computer software. Whether a function is performed by hardware or computer software driving the hardware depends on the application and design constraints of the technical solution. Those of ordinary skill in the art may implement the described functionality by using different methods for each application, but such implementations should not be considered to be beyond the scope of the present application.

Figure 7:
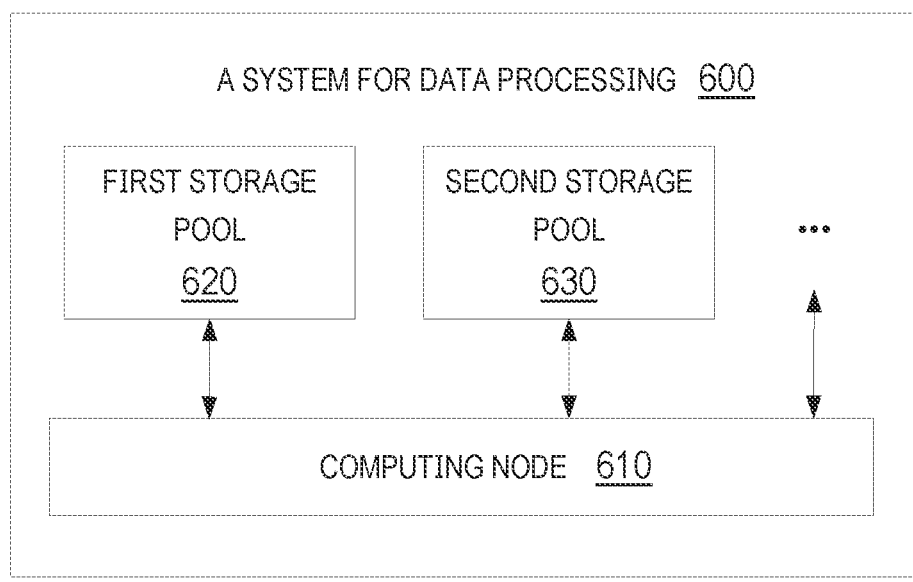
FIG. 7 is a schematic diagram of a method for data processing provided by an example of the present application.

Next, take the system being a system for data processing as an example for introduction and explanation. Referring to FIG. 7, the system 600 includes a computing node 610, and a first storage pool 620 and a second storage pool 630 coupled with the computing node 610. The computing node 610 is configured to: receive an access request for a data block, the data corresponding to the data block being stored in the first storage pool 620; in response to the access request, determine a second storage pool 630 in accordance with the data heat level of the data block and the bandwidth required for the data block; and write the data corresponding to the data block into the second storage pool 630. In one example, the system 600 may include plurality of computing nodes 610 and plurality of storage pools, each computing node 610 coupled to the plurality of storage pools.

In a possible implementation, the computing node 610 is configured to: when the heat level difference between the data heat level of the data block and the reference heat level is within the threshold range of heat level difference between a heat level of a data block that the second storage pool 630 supports to store and the reference heat level, and the bandwidth difference between the bandwidth required for the data block and the remaining bandwidth of the first storage pool 620 is within the threshold range of bandwidth difference between the second storage pool 630 and the first storage pool 620, determine the second storage pool 630.

In a possible implementation, the performance of the second storage pool 630 is different from the performance of the first storage pool 620, where the performance includes at least one of access speed or access delay.

In a possible implementation, the data heat level of the data block is determined in accordance with the number of accesses of the data block and the access request delay of the data block, the access request delay of the data block being the time difference between the time when accessing the storage area in the first storage pool 620 in which the data corresponding to the data block is stored and the time when receiving the response from the first storage pool 620.

In a possible implementation, the reference heat level is the heat level of the data block that the first storage pool 620 supports to store.

In a possible implementation, the reference heat level is the heat level of historical access for the data block.

In a possible implementation, the computing node 610 is further configured to: receive first indication information, wherein the first indication information is to indicate the remaining bandwidth of the first storage pool 620 and the reference heat level.

In a possible implementation, the computing node 610 is configured to: write the data corresponding to the data block into the second storage pool 630 within a preset time, the preset time determined in accordance with the access network delay of the data block. The access network delay of the data block is the time difference between the time when sending the access request and the time when receiving the access request.

In a possible implementation, the computing node 610 is further configured to: receive second indication information, where the second indication information is to indicate the access network delay of the data block.

In a possible implementation, the data block is one of a plurality of data blocks in a target file, and data corresponding to at least two data blocks of the plurality of data blocks respectively is stored in different storage pools.

The above system 600 provided by an example of the present application is to implement the corresponding functions of each operation of the foregoing method, and since each of the above operations has been described in detail in the foregoing method example, they may not be repeated here.

An example of the present application further provides a server, the first storage pool and the second storage pool both coupled to the server, and the server being configured to: receive an access request for a data block, the data corresponding to the data block being stored in the first storage pool; in response to the access request, determine a second storage pool in accordance with the data heat level of the data block and the bandwidth required for the data block, and write the data corresponding to the data block into the second storage pool.

In a possible implementation, the server is configured to: when the heat level difference between the data heat level of the data block and the reference heat level is within the threshold range of heat level difference between a heat level of a data block that the second storage pool supports to store and the reference heat level, and the bandwidth difference between the bandwidth required for the data block and the remaining bandwidth of the first storage pool is within the threshold range of bandwidth difference between the second storage pool and the first storage pool, determine the second storage pool.

In a possible implementation, the performance of the second storage pool is different from the performance of the first storage pool, and wherein the performance includes at least one of access speed or access delay.

In a possible implementation, the data heat level of the data block is determined in accordance with the number of accesses of the data block and the access request delay of the data block, the access request delay of the data block being the time difference between the time when accessing the storage area in the first storage pool in which the data corresponding to the data block is stored and the time when receiving the response from the first storage pool.

In a possible implementation, the reference heat level is the heat level of the data block that the first storage pool supports to store.

In a possible implementation, the reference heat level is the heat level of historical access for the data block.

In a possible implementation, the server is further configured to: receive first indication information, where the first indication information is to indicate the remaining bandwidth of the first storage pool and the reference heat level.

In a possible implementation, the server is configured to: write the data corresponding to the data block into the second storage pool within a preset time, the preset time determined in accordance with the access network delay of the data block, the access network delay of the data block being the time difference between the time when sending the access request and the time when receiving the access request.

In a possible implementation, the server is further configured to: receive second indication information, where the second indication information is to indicate the access network delay of the data block.

In a possible implementation, the data block is one of a plurality of data blocks in a target file, and data corresponding to at least two data blocks of the plurality of data blocks respectively is stored in different storage pools.

The above server is provided by an example of the present application for implementing the corresponding functions of each operation of the foregoing method, and since each of the operations has been described in detail in the foregoing method example, they may not be repeated here.

An example of the present application provides a computer-readable storage medium. The computer-readable storage medium stores program code therein, and when it is run on a device (e.g., the device may include a microcontroller, a chip, a computer or a processor, etc.), the program code therein may be invoked by a processor to execute one or more operations in the method example described above.

Based on this understanding, an example of the present application further provides a computer program product containing instructions, the essence of the technical solution of the present application or the part that contributes to the prior art or all or part of the technical solution being embodied in the form of a software product, which is stored in a storage medium, and includes several instructions to enable a computer device (which may include a personal computer, server, or network device, etc.) or a processor therein to execute all or part of the operations of the methods described in various examples of the present application.

The above descriptions are only implementations of the present application, but the claimed scope of the present application is not limited thereto, and changes or substitutions within the technical scope disclosed in the present application shall fall within the claimed scope of the present application. Therefore, the claimed scope of the present application should be determined by the claimed scope of the claims.

What is claimed is:
1. A method of data processing, including:
   receiving an access request for a data block corresponding to data stored in a first storage pool;
   in response to the access request, determining a second storage pool in accordance with a data heat level of the data block and a bandwidth required for the data block, wherein the determining comprises:
 determining a heat level difference between the data heat level of the data block and a reference heat level is within a threshold range of heat level difference between a heat level of a data block that the second storage pool supports to store and the reference heat level; and
 determining a bandwidth difference between the bandwidth required for the data block and remaining bandwidth of the first storage pool is within a threshold range of bandwidth difference between the second storage pool and the first storage pool; and
 writing the data corresponding to the data block into the second storage pool.

2. The method of claim 1, wherein performance of the second storage pool is different from performance of the first storage pool, and wherein the performance includes at least one of access speed or access delay.

3. The method of claim 1, wherein the data heat level of the data block is determined in accordance with a number of accesses of the data block and an access request delay of the data block; and
 wherein the access request delay of the data block is a time difference between a time of accessing a storage area in the first storage pool in which the data corresponding to the data block is stored and the time when receiving a response from the first storage pool.

4. The method of claim 1, wherein the reference heat level is a heat level of a data block that the first storage pool supports to store.

5. The method of claim 1, wherein the reference heat level is a heat level of historical access for the data block.

6. The method of claim 1, further comprising:
 receiving first indication information which is to indicate the remaining bandwidth of the first storage pool and the reference heat level.

7. The method of claim 1, wherein writing the data corresponding to the data block into the second storage pool includes writing the data corresponding to the data block into the second storage pool within a preset duration of time determined according to an access network delay of the data block, wherein the access network delay of the data block is a time difference between a transmission time of the access request and a reception time of the access request.

8. The method of claim 7, further comprising:
 receiving second indication information, which indicates the access network delay of the data block.

9. The method of claim 1, wherein the data block is one of a plurality of data blocks in a target file, and data corresponding to at least two data blocks of the plurality of data blocks respectively is stored in different storage pools.

10. A system for data processing, including:
 a first storage pool;
 a second storage pool; and
 a computing node coupled with the first and second storage pools, the computing node configured to:
  receive an access request for a data block, data corresponding to the data block being stored in the first storage pool;
  in response to the access request, determine the second storage pool in accordance with a data heat level of the data block and a bandwidth required for the data block, wherein the determining comprises:
   determining a heat level difference between the data heat level of the data block and a reference heat level is within a threshold range of heat level difference between a heat level of a data block that the second storage pool supports to store and the reference heat level; and
   determining a bandwidth difference between the bandwidth required for the data block and remaining bandwidth of the first storage pool is within a threshold range of bandwidth difference between the second storage pool and the first storage pool; and
  write the data corresponding to the data block into the second storage pool.

11. The system of claim 10, wherein performance of the second storage pool is different from performance of the first storage pool, and wherein the performance includes at least one of access speed or access delay.

12. The system of claim 10, wherein the data heat level of the data block is determined in accordance with a number of accesses of the data block and an access request delay of the data block;
 wherein the access request delay of the data block is a time difference between a time of accessing a storage area in the first storage pool in which the data corresponding to the data block is stored and the time when receiving the response from the first storage pool.

13. The system of claim 10, wherein the reference heat level is a heat level of a data block that the first storage pool supports to store.

14. The system of claim 10, wherein the reference heat level is a heat level of historical access for the data block.

15. The system of claim 10, wherein the computing node is further configured to:
 receive first indication information which indicates the remaining bandwidth of the first storage pool and the reference heat level.

16. The system of claim 10, wherein the computing node is configured to write the data corresponding to the data block into the second storage pool within a preset duration of time determined according to an access network delay of the data block, wherein the access network delay of the data block is a time difference between a transmission time of the access request and a reception time of the access request.

17. The system of claim 10, wherein the data block is one of a plurality of data blocks in a target file, and data corresponding to at least two data blocks of the plurality of data blocks respectively is stored in different storage pools.

18. A computer-readable storage medium having a program code stored thereon, which, when executed by a processor, causes the processor to:
 receive an access request for a data block, data corresponding to the data block being stored in a first storage pool;
 in response to the access request, determine a second storage pool in accordance with a data heat level of the data block and a bandwidth required for the data block, wherein the determining comprises:
  determining a heat level difference between the data heat level of the data block and a reference heat level is within a threshold range of heat level difference between a heat level of a data block that the second storage pool supports to store and the reference heat level; and
  determining a bandwidth difference between the bandwidth required for the data block and remaining bandwidth of the first storage pool is within a threshold range of bandwidth difference between the second storage pool and the first storage pool; and write the data corresponding to the data block into the second storage pool.

19. The computer-readable storage medium of claim 18, wherein the data heat level of the data block is determined in accordance with a number of accesses of the data block and an access request delay of the data block; and wherein the access request delay of the data block is a time difference between a time of accessing a storage area in the first storage pool in which the data corresponding to the data block is stored and the time when receiving a response from the first storage pool.

20. The computer-readable storage medium of claim 18, wherein the data block is one of a plurality of data blocks in a target file, and data corresponding to at least two data blocks of the plurality of data blocks respectively is stored in different storage pools.

* * * * *